United States Patent [19]
Okuhara et al.

[11] Patent Number: 5,974,565
[45] Date of Patent: Oct. 26, 1999

[54] COMPOSITE COMPUTER SYSTEM

[75] Inventors: Susumu Okuhara; Hiroshi Morishima; Shingo Maeda; Kikuko Morishima, all of Yokohama, Japan

[73] Assignee: Hitachi, Ltd., Tokyo, Japan

[21] Appl. No.: 08/768,969

[22] Filed: Dec. 18, 1996

[30] Foreign Application Priority Data

Dec. 20, 1995 [JP] Japan ................................... 7-331357

[51] Int. Cl.⁶ .................................................. G06F 11/00
[52] U.S. Cl. .................................. 714/11; 714/47; 714/57
[58] Field of Search ...................... 395/182.02, 182.09, 395/182.08, 184.01, 185.01, 185.1, 183.13, 183.19, 183.22, 200.54, 200.5, 200.51, 200.53; 714/11, 10, 4, 47, 48, 57, 46

[56] References Cited

U.S. PATENT DOCUMENTS

| | | | |
|---|---|---|---|
| 5,237,677 | 8/1993 | Hirosawa et al. | 395/183.22 |
| 5,446,892 | 8/1995 | Suzuki et al. | 395/182.02 |
| 5,475,625 | 12/1995 | Glaschick | 395/600 |
| 5,487,148 | 1/1996 | Komori et al. | 395/182.02 |
| 5,535,335 | 7/1996 | Cox et al. | 395/200.11 |
| 5,568,605 | 10/1996 | Clouston et al. | 395/182.02 |
| 5,590,120 | 12/1996 | Vaishnavi et al. | 370/254 |
| 5,590,277 | 12/1996 | Fuchs et al. | 394/183.14 |
| 5,592,620 | 1/1997 | Chen et al. | 395/200.01 |
| 5,627,766 | 5/1997 | Beaven | 395/200.11 |
| 5,640,513 | 6/1997 | Dauerer et al. | 395/200.11 |
| 5,650,940 | 7/1997 | Tonozuka et al. | 364/514 C |
| 5,692,119 | 11/1997 | Koguchi et al. | 395/182.02 |
| 5,713,027 | 1/1998 | Soejima et al. | 395/182.22 |

*Primary Examiner*—Joseph E. Palys
*Attorney, Agent, or Firm*—Antonelli, Terry, Stout & Kraus, LLP

[57] ABSTRACT

A composite computer system which includes a plurality of processors connected to each other by a communication apparatus, an operation supervisory unit for recording operating conditions of the processors when the processors are activated or deactivated, an operation supervisory network for connecting the processors and the operation supervisory unit and a program condition management apparatus for recording operating conditions of programs when the programs of the processors are activated or deactivated. The operation supervisory unit obtains, for fault location purposes, the operating conditions of the processors recorded in the operation supervisory unit via the operation supervisory network and the operating conditions of the programs recorded in the program condition management apparatus.

24 Claims, 6 Drawing Sheets

COMPOSITE COMPUTER SYSTEM

BACKGROUND OF THE INVENTION

The present invention relates to a composite computer system for making access through exclusive control of common resources with a plurality of processors operating independently. More particularly, the present invention relates to a technique which can effectively be applied to a composite computer system which executes alternative processing by quickly finding a fault generated at the time of making access through exclusive control of common resources with a plurality of processors.

In an existing load distribution/incorporation type composite computer system where a plurality of processors connected with each other use in common resources such as magnetic disk units or magnetic tape units, incorporation between a plurality of processors has been established by connecting input/output units such as an interchannel coupling unit for making communication between a plurality of processors to realize mutual communication with input/output instructions.

However, in such an existing composite computer system, if interconnection with a processor of a distant station is disabled due to a fault in channel or in a communication path or a fault such as system-down, exclusive processing of resources used in common can no longer be continued.

Therefore, if no-response of the processor in the distant station is detected, a message indicating detection of no-response processor is issued to an operator. Thereby fault location has been made depending on judgment of a person and jobs have also been continued by the processings corresponding to the fault generated.

The response procedures for fault detection in the existing composite computer system is described as "Operator Procedures for MSCF Fault" in the manual entitled "System Operation of Program Product VOS3/AS - JSS3 -", published on December 1994 by Hitachi Limited.

Moreover, in view of saving communication overhead between a plurality of processors in the existing composite computer system, a memory for exclusive control for management of the common resources is provided for effective incorporation between a plurality of processors. For example, lock information for exclusive control is arranged in a non-volatile control memory provided in unit of volume of duplicated magnetic disk units and thereby such lock information for exclusive control of the control memory is used in the disk double-writing control program.

In the disk overwriting control program, when a processor updates the lock information, a plurality of processors are incorporated with each other by making use of the function to report it as an asynchronous input/output interrupt to the other processors. However, if a processor generates system-down while having the lock information in the existing composite computer system, the lock information cannot be reserved for access to the overwriting magnetic disk unit of the other processors operating normally and thereby input/output time over occurs, disabling continuation of the processings.

Since it is impossible to judge the operating conditions of the other processors in the prior art where exclusive control of common resources is executed by making communication between a plurality of processors using input/output units such as the interchannel coupling units explained above and in the prior art where the exclusive control is executed by giving the lock information to one processor like the disk double-writing control program explained above, intervention by the operator is necessary for cancelling of lock information when a fault is generated in the processors having such lock information. Therefore, in the composite computer system of the prior art, it is necessary to previously perform a manual recovery procedure assuming a combination for occurrence of a fault. Such a procedure increases the load for operation of the composite computer system.

The existing composite computer system has a problem that a load shared by an operator such as the generation of operation procedures is increased. Alternatively, it is impossible to cover a long of time automatic operation at the time of message output because when no response of the processor in the distant party is detected, a message is issued to the operator to indicate that a processor of no-response has been detected. Thus, to continue the job the location of fault must be identified depending on judgment of a person.

Moreover, when a processor has generated a system-down while it has the lock information in the disk double-writing control program of the existing composite computer system, and since cancellation of the lock information requires an operator's intervention, the manual recovery procedure assuming a particular combination for generation of fault must be performed beforehand, resulting in a load on operation.

SUMMARY OF THE INVENTION

It is therefore an object of the present invention to provide a technique to realize, when a fault is generated, long term automatic operation and alleviate the load of user by quickly locating a defective area and executing the corresponding processing.

It is another object of the present invention to provide a technique to continue supervision of operating conditions of a plurality of processors when a particular operation supervisory unit can no longer be operated due to a fault generated therein.

It is yet another object of the present invention to provide a technique to continue supervision of operating conditions of a plurality of processors when the operation supervisory units are totally disabled.

In a composite computer system for making access by connecting a plurality of processors with a communication apparatus and then exclusively controlling particular common resources. The composite computer operation supervisory unit for recording the operating conditions of the plural processors when a plurality of processors are activated or deactivated, operation supervisory network for connecting the plural processors and operation supervisory unit and program condition management means for recording operating condition of the program when programs of the plural processors are activated or deactivated. Wherein if a fault is generated in a plurality of processors, fault location is performed by obtaining operating conditions of the plural processors recorded in the operation supervisory unit and operating condition of the programs recorded in the program condition management means through the operation supervisory network.

In the composite computer system, a plurality of processors are connected with a particular communication apparatus such as an interchannel coupling unit and communication is executed between a plurality of processors with a particular communication apparatus such as an interchannel coupling unit as explained above in order to make access through exclusive control of particular common resources such as magnetic disk and magnetic tape units.

A plurality of processors forming a composite computer system explained above are connected to an operation supervisory unit through an operation supervisory network which is different from the particular communication apparatus for exclusive control such as the interchannel coupling unit. When a plurality of processors are activated or deactivated. The operating conditions of the plurality of processors are recorded in the operation supervisory unit. Moreover, an operating system operated in a plurality of processors of the composite computer system records, when the program is activated or deactivated on a plurality of processors, the operating condition of the program in the program condition management apparatus.

In the composite computer system, when access is made through exclusive control to the particular common resources such as a magnetic disk unit or a magnetic tape unit with a particular communication apparatus for exclusive control such as the interchannel coupling unit, no-response condition is detected in some cases. In other words, no response can be obtained from a particular processor even after a prescribed period of time has passed. When no-response condition is detected, it is assumed as generation of a fault in the composite computer system. Therefore, the operating condition of a plurality of processors recorded in the operation supervisory unit via the operation supervisory network and the operating condition of the program recorded in the program condition management apparatus are obtained for the purpose of fault location by comparing the operating condition of particular processor with the operating condition of program on the particular processor.

If a particular processor is deactivated, the processor is assumed to be a defective processor and the exclusive processing is continued by the other processors as the compressed operation. But, when the processor is activated, the operating condition of the program on the processor is searched.

When the program on the processor is detected to be deactivated as a result of the search for operating condition of the program on the processor, a fault is assumed to exist in the program on the processor and the program on the processor is activated again. When the program on the processor is activated, a fault is assumed to exist in the communication apparatus for exclusive control and the exclusive control is continued by selecting a backup communication route.

As explained above, according to the composite computer system, since the operating condition of a plurality of processors and the operating condition of the program on a plurality of processors are supervised through the operation supervisory network, long term automatic operation and alleviation of loads shared on the user can be realized by quickly locating a fault, if a fault is generated, and taking a proper measure to the defective area.

In the composite computer system described above, a plurality of operation supervisory units for recording operating conditions of the plural processors if the plural processors are activated or deactivated, communication control apparatus for controlling communication to the plural processors from the operation supervisory units other than the particular unit and operation supervisory unit multiplexing apparatus for making communication to the plural operation supervisory units from the plural processors and controlling the communication control apparatus of the plural operation supervisory units are provided. In such a system the operating conditions of the plural processors are supervised with only a particular operation supervisory unit of the plural operation supervisory units by transmitting operating conditions of the plural processors to the plural operation supervisory units with the operation supervisory unit multiplexing apparatus controlling communication to the plural processors from the operation supervisory units other than the particular one with the communication control means. If a fault is generated in the particular operation supervisory unit, communicating control condition of the communication control apparatus of a particular operation supervisory unit of plural units other than the unit having generated a fault is cancelled with the operation supervisory unit multiplexing apparatus and the operating condition of the plural processors is supervised continuously with the operation supervisory unit for which the communicating condition is cancelled.

In the composite computer system, a plurality of processors and a plurality of supervisory units are connected with an operation supervisory network and a plurality of supervisory units are provided with communication control apparatus for controlling communication with a plurality of processors. The composite computer system notifies respectively the messages from a plurality of processors to a plurality of operation supervisory units with an operation supervisory unit multiplexing apparatus.

Meanwhile, a plurality of operation supervisory units control the communication control apparatus of the operation supervisory units other than the particular units to the communication controlled condition and define the particular operation supervisory units as the main units and the units other than the particular units as the sub-units to control the communication to a plurality of processors from the units other than the operation supervisory units as the main units.

As explained above, since communication to a plurality of processors from the operation supervisory units is controlled by the communication control apparatus in the operation supervisory unit as the sub-units, a message transmitted when system-down of the particular processors is detected is never transmitted in duplication to the other operating processors.

In the composite computer system, if a fault is generated in the operation supervisory unit as the main unit, no response can be obtained, even after the prescribed period of time has passed, from the operation supervisory unit as the main unit and communication between a plurality of processors and operation supervisory unit as the main unit is disabled. The operation supervisory unit multiplexing apparatus cancels the controlled condition of the communication controlling apparatus of the particular operation supervisory units of the units as the sub-unit.

As explained above, if the particular operation supervisory unit among those multiplexed can no longer be used due to a fault, it is not required to take attention to a plurality of processors and the operating condition of a plurality of processors can be supervised continuously with the other operation supervisory units not generating a fault. As explained above, according to the composite computer system, since operating conditions of a plurality of processors are supervised with a plurality of operation supervisory units, if a particular operation supervisory unit cannot be operated due to a fault generated therein, operating conditions of a plurality of processors can be continuously supervised.

In the composite computer systems described above a plurality of processors supervise the operating conditions with each other by transmitting and receiving particular data between a plurality of processors through a communication apparatus connecting a plurality of processors. The communication apparatus could be apparatus such as an interchannel coupling unit, magnetic disk unit or magnetic tape unit or any other apparatus that allows communication between the processors.

In the composite computer system, the program operating on a plurality of processors issues an input/output instruction in a constant interval through a particular communication apparatus such as an interchannel coupling unit connecting a plurality of processors. For example, the program operating in the particular processor transmits the particular data in the program operating on the other processors. The program operating on the other processors, returns, upon reception of the particular data explained above, the data which is confirmed to be received, as the response to the program operating on the particular processors as the transmitting processor.

Since the programs operating on a plurality of processors transmit and receive particular data with each other in the sequence explained above, if a fault is generated, no response may be received even after the prescribed period of time has passed. Accordingly, no-response indicates generation of a fault in a certain processor. As explained above, when the programs operating on a plurality of processors mutually transmit or receive the particular data, a communication load is considered to be increased quickly when the number of programs for transmitting and receiving particular data with each other increases. However, but since ordinary fault location may be realized with the operation supervisory unit in the composite computer system, frequency of transmission and reception of particular data may be lowered.

Therefore, in the composite computer system, influence on the ordinary communication can be lowered by reducing overhead for transmitting and receiving particular data between a plurality of processors and operating conditions of a plurality of processors can be supervised continuously even if total operation of the operation supervisory unit is disabled due to generation of a fault.

Further, as explained above, according to the composite computer system, since the operating conditions of the other processors are supervised by transmitting and receiving particular data between a plurality of processors, if total operation of the operation supervisory unit is disabled, operating conditions of a plurality of processors can be continuously supervised.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS OF THE INVENTION

The present invention and preferred embodiments thereof will be explained in detail with reference to the accompanying drawings. The like elements having similar functions are designated by the like reference numerals throughout the drawings to explain the embodiments and repetitive explanations will not be made.

First Embodiment

A composite computer system as the first embodiment for supervising a plurality of processors to make access to the common data on the magnetic disk unit through the exclusive control management program in the composite computer system of the present invention will be explained.

Figure 1:
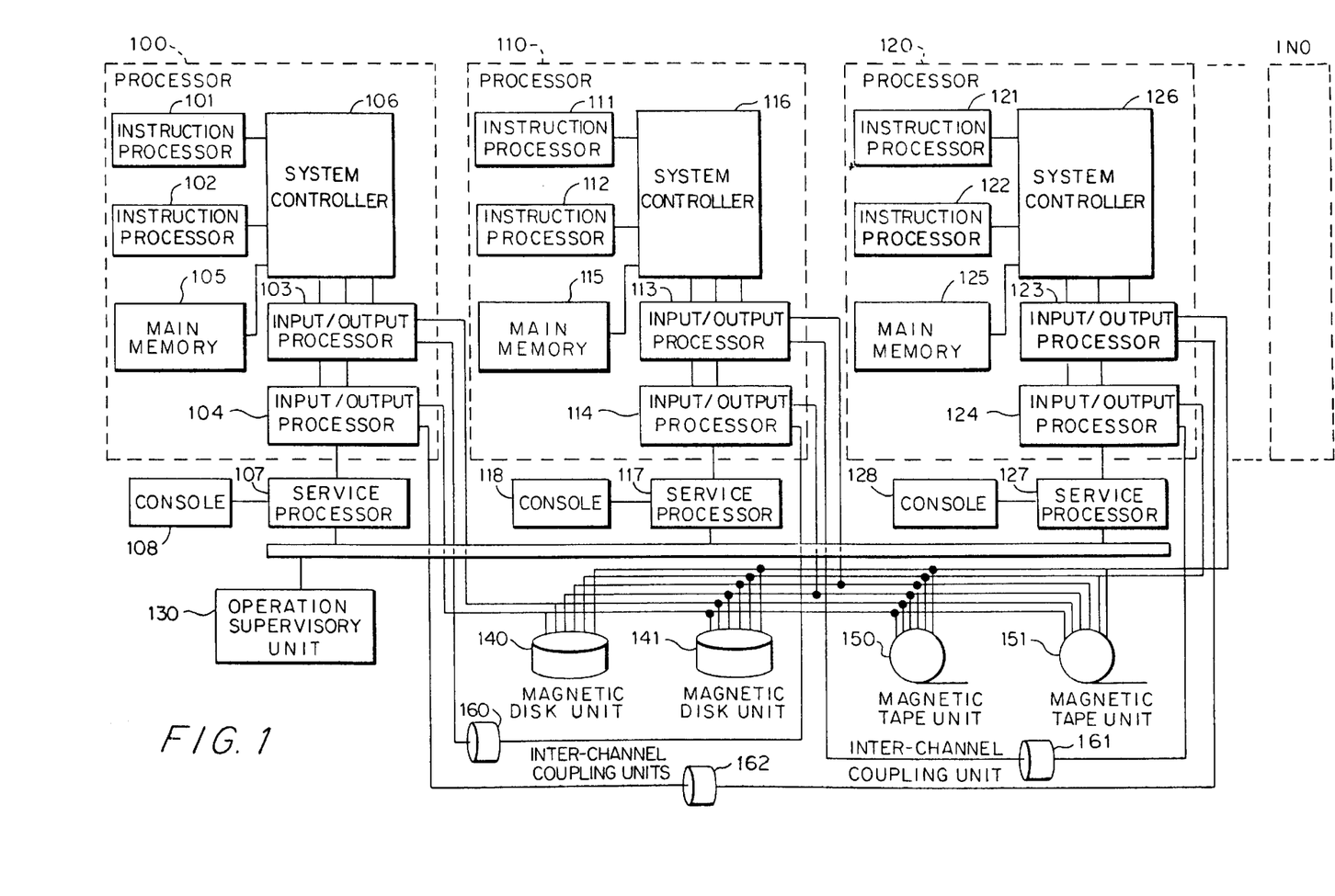
FIG. 1 is a diagram illustrating a schematic structure of a composite computer system as the first embodiment of the present invention.

FIG. 1 illustrates a schematic structure of a composite computer system as an embodiment of the present invention. In FIG. 1, 100, 110 and 120 designate processors; 101, 102, 111, 112, 121 and 122, instruction processors; 103, 104, 113, 114, 123 and 124, input/output processors; 105, 115 and 125, main memories; 106, 116 and 126, system controllers; 107, 117 and 127, service processors; 108, 118, 128, consoles; 130, operation supervisory unit; 140 and 141, magnetic disk units; 150 and 151, magnetic tape units; 160 to 162, interchannel coupling units. It should be noted that the system may include any number of processors as illustrated by processor 1NO.

As shown in FIG. 1, the composite computer system of the first embodiment of the present invention comprises the processors 100, 110 and 120, instruction processors 101, 102, 111, 112, 121 and 122, input/output processors 103, 104, 113, 114, 123 and 124, main memories 105, 115 and 125, system controllers 106, 116 and 126, service processors 107, 117 and 127, consoles 108, 118 and 128, operation supervisory unit 130, magnetic disk units 140 and 141, magnetic tape units 150 and 151, and interchannel coupling units 160 to 162. The interchannel coupling units 160–162 may be provided with duplicate (redundant) circuits to permit the unit to continue to operate if one of the circuits fails or is in use.

Moreover, as shown in FIG. 1, in the composite computer system in the preferred embodiment of the present invention, a processor 100 connects an instruction processor 101, an instruction processor 102, an input/output processor 103, an input/output processor 104 and a main memory 105 to a system controller 106 and moreover a service processor 107 and a console 108 are also connected to the processor 100 for instructing system activation and defining hardware structure.

Moreover, the processor 110 connects an instruction processor 111, an instruction processor 112, an input/output processor 113, an input/output processor 114 and a main memory 115 to a system controller 116 and a service processor 117 and a console 118 are also connected to the processor 110 for instructing system activation and defining hardware structure. Meanwhile, the processor 120 connects an instruction processor 121, an instruction processor 122, an input/output processor 123, an input/output processor 124 and a main memory 125 to a system controller 126 and a service processor 127 and a console 128 are also connected to the processor 120 for instructing system activation and defining hardware structure.

The input/output processors 103, 104, 113, 114, 123 and 124 are connected to the magnetic disk units 140 and 141 and magnetic tape units 150 and 151, while the plurality of processors 100, 110 and 120 use the magnetic disk units 140, 141 and magnetic tape units 150 and 151 as the common resources.

Moreover, the input/output processor 103 is connected to the input/output processor 114 via the interchannel coupling unit 160, while the input/output processor 113 to the input/output processor 124 via the interchannel coupling unit 161 and the input/output processor 123 to the input/output processor 104 via the interchannel coupling unit 162. A plurality of processors 100, 110 and 120 are connected with each other in the multipath structure.

For communication of a processor 100 or 110 or 120 with the other processors, the input/output processors 103 and 114, or the input/output processors 113 and 124 or the input/output processors 123 and 104 are used via the interchannel coupling unit 160 or 161 or 162.

The above-described apparatus, particularly the interchannel coupling units, 160, 161 and 162, the magnetic disk units 140 and 141, and the magnetic tape units 150 and 151 provide communication apparatus for allowing communication between the processors 100, 110, 120 and 1NO.

In the composite computer system in the embodiment of the present invention, the operation supervisory unit 130 executes the total management of the operating information and format information of the processors 100, 110 and 120 by connecting the service processors 107, 117 and 127 for controlling the conditions of the processors 100, 110 and 120 and operation supervisory unit 130 with LAN (Local Area Network) as the operation supervisory network.

Operation management activated by the system of processors 100, 110 and 120 or by the program operating on the processors 100, 110 and 120 in the composite computer system in the embodiment of the present invention will be explained.

Figure 2:
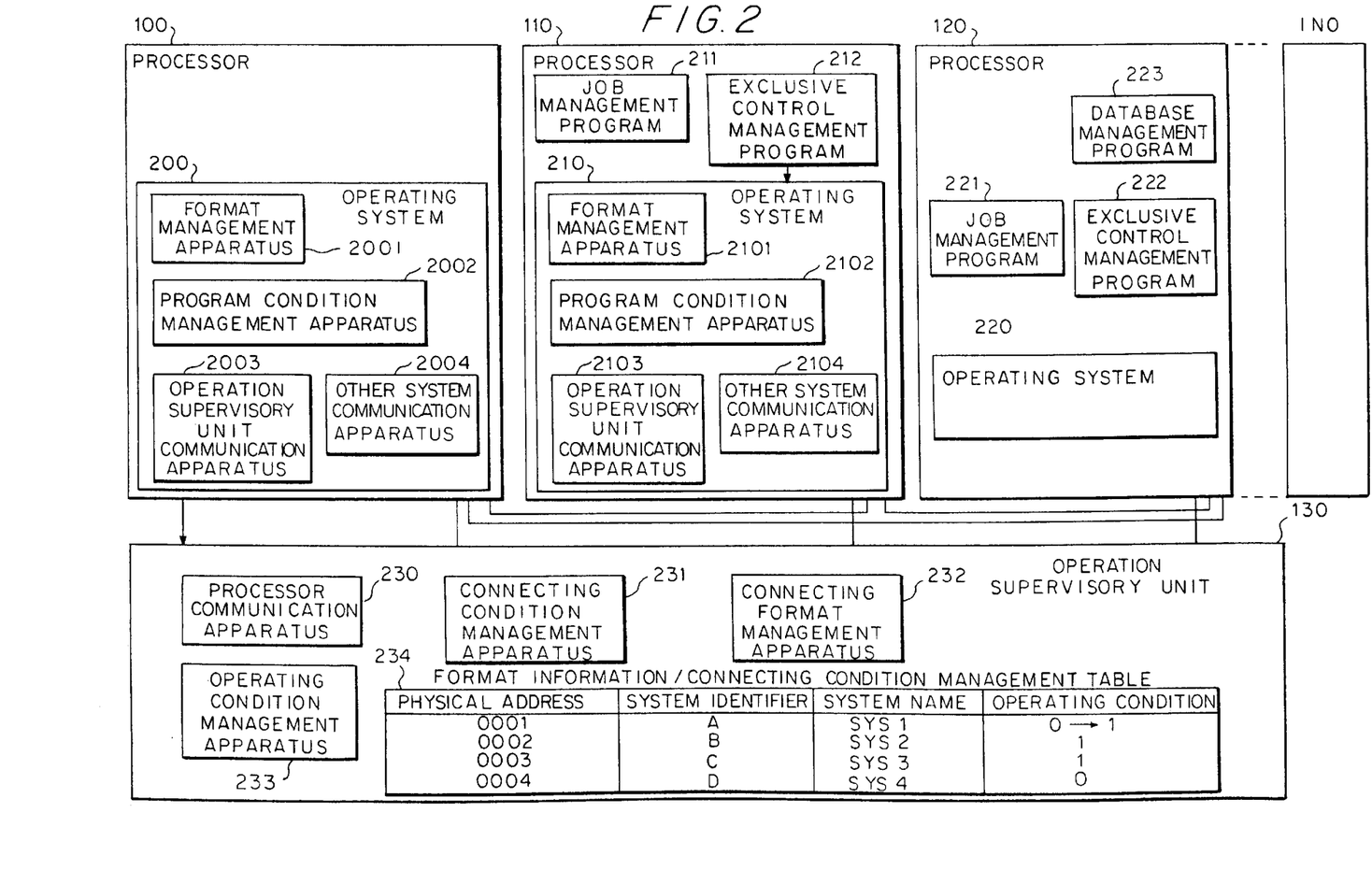
FIG. 2 is a diagram illustrating outline of operation management when the composite computer system of the first embodiment is activated.

FIG. 2 is a schematic diagram of operation management when the composite computer system in the embodiment of the present invention is activated. The elements illustrated in FIG. 2 may take the form of a single computer program or plural computer programs. In FIG. 2, 200, 210 and 220 designate operating systems; 2001, 2101 and 2201, format management apparatus; 2002, 2102 and 2204, program condition management apparatus; 2003 and 2103, operation supervisory unit communication apparatus; 2004, 2104 and 2204, other system communication apparatus; 201, 211 and 221, job management programs; 202, 212 and 222, exclusive control management programs; 223, database management program; 230, processor communication apparatus; 231, connecting condition supervisory apparatus; 232, connection format management apparatus; 233, operating condition management apparatus; 234, format information/operating condition management table.

As shown in FIG. 2, the elements used for operation management when the composite computer system in the preferred embodiment of the present invention includes the operating systems 200, 210 and 220, format management apparatuses 2001 and 2101 and 2201, program condition management apparatuses 2202, 2102 and 2202, operation supervisory communication apparatus 2003 and 2103, other system communication apparatus 2004 and 2104, job management programs 211 and 221, exclusive control management programs 212 and 222, database management program 223, processor communication apparatus 230, connecting condition supervisory apparatus 231, connection format management apparatus 232, operating condition management apparatus 233 and format information/operating condition management table 234.

Moreover, as shown in FIG. 2, in the operation management when the composite computer system in the preferred embodiment of the present invention, when the system of the processors 100, 110 and 120 is activated and when the program operating on the processors 100, 110 and 120 is activated, an activation message is sent to the operation supervisory unit 130 to update contents of the format information/operating condition management table 234.

In the format information/operating condition management table 234 stored in the operation supervisory unit 130 of the composite computer system in the preferred embodiment of the present invention, physical addresses, system identifiers, system names and operating conditions of the processors 100, 110 and 120 connected to the operation supervisory unit 130 controlled by the connection format management apparatus 232 are stored. When the operating condition of the format information/operating condition management table 234 is "0", it indicates that the processor is deactivated, while when the operating condition is "1", it indicates that the processor is activated.

The operation management when the system of processor 110 is activated in the composite computer system in the preferred embodiment of the present invention will be explained.

When the system of the processor 100 is activated in the composite computer system in the preferred embodiment of the present invention, the operating system 200 of the processor 100 issues an activation notifying instruction to the operation supervisory unit 130 to notify that the system of processor 100 is activated. Particularly, an activation notice is sent to the operation supervisory unit 130 by apparatus of the operation supervisory unit communication apparatus 2003 via the format management apparatus 2001.

Figure 6:
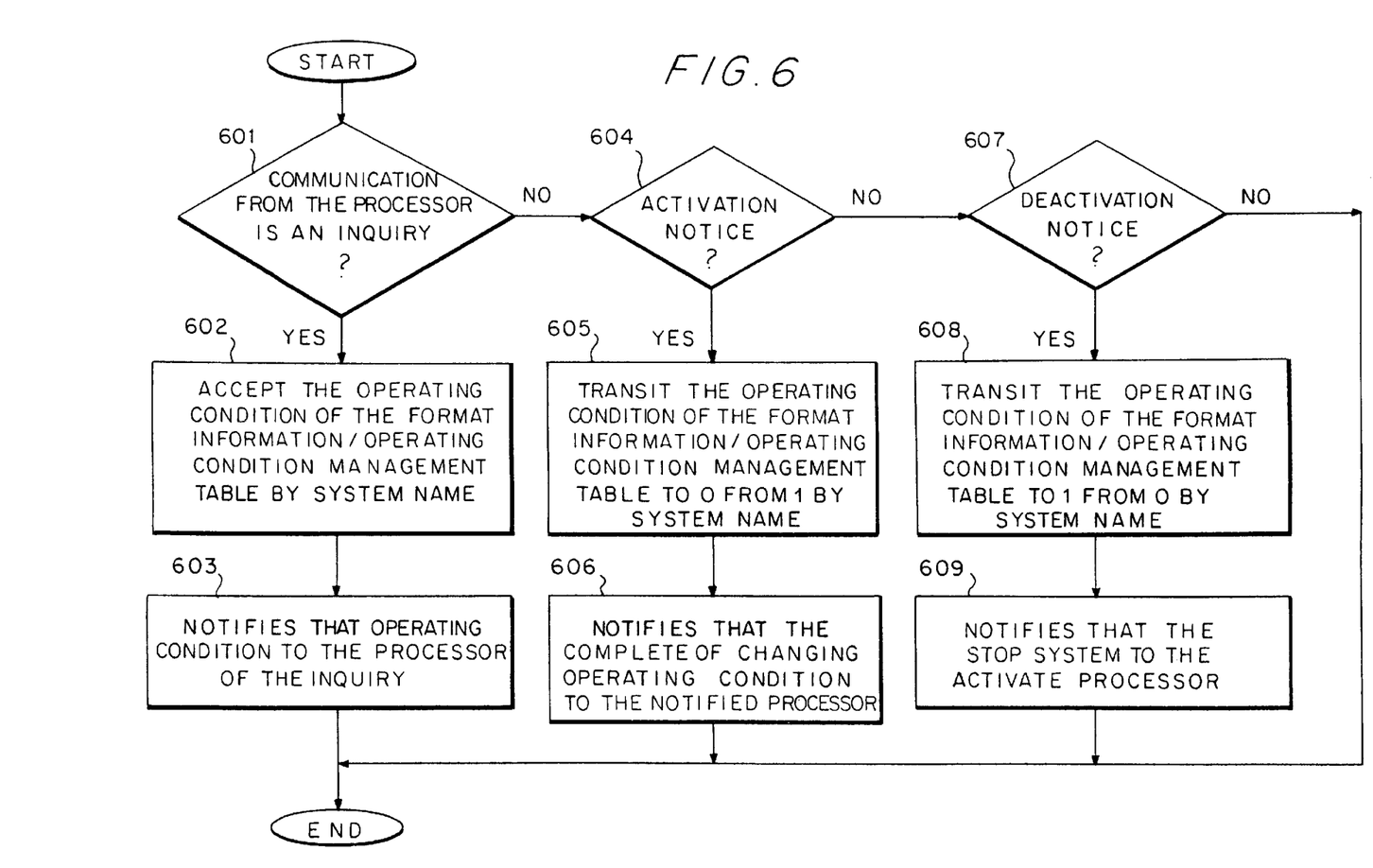
FIG. 6 is a flowchart illustrating the processing procedures for management of the operating conditions in the operation supervisory unit of the first embodiment of the invention.

The processor communication apparatus 230 of the operation supervisory unit 130 accepts a notice of the processor 100 transmitted by the operation supervisory unit communication apparatus 2003. The processor communication apparatus 230 of the operation supervisory unit 130 decides whether the notice is an inquiry of the operating condition or a notice of an activation or a deactivation in the step 601 as shown in FIG. 6.

If the notice is not an inquiry, in the step 604, the notice is checked to determine whether it is an activation or deactivation by the operation supervisory unit 130. If the notice is an activation notice, in the step 605, the operation supervisory unit 130 analyzes parameters of the activation notice, and transmits (changes) the parameter showing the operating condition of the processor 100, e.g., the condition of the physical address "0001", system identifier "A" and system "SYS1" of the format information/operating condition management table 234 from "0" indicating the deactivated condition to "1" indicating the activated condition.

After changing the operating condition of the processor 100, in the step 606, the processor communication apparatus 230 of the operation supervisory unit 130 issues a reply that the activation notice has been processed to the processor which issued the activation notice.

In the composite computer system in the preferred embodiment of the present invention, it is also possible that the operation supervisory unit 130 is constituted by a computer having rather lower processing capability and a response to the activation notice is returned to the processor 100 through a comparatively lower speed asynchronous communication line.

The operating system 200 of the processor 100 analyzes the response from the operation supervisory unit 130 received by the operation supervisory communication apparatus 2003 with the format management apparatus 2001 to detect whether the operating condition of the processor 100 of the format information/operating condition management table 234 has been normally updated or not.

When the systems of the processors 110 and 120 of the composite computer system in the preferred embodiment of the present invention are activated in the same manner, as shown in FIG. 2, the operating condition of the processor 110 corresponding to the physical address 0002, system identifier B and system name SYS2 and the operating condition of the processor 120 corresponding to the physical address 0003, system identifier C and system name SYS3 are recorded as 1 indicating the activated condition in the format information/operating condition management table 234 stored in the operation supervisory unit 130.

Moreover, since the processor corresponding to the physical address 0004, system identifier D and system name SYS4 in the format information/operating condition management table 234 stored in the operation supervisory unit 130 is not connected to the composite computer system in the preferred embodiment of the present invention, its operating condition is given as 0, indicating the deactivated condition.

When a program is activated with the operating system of each processor in the composite computer system in the preferred embodiment of the present invention, the operating system records that the program is being activated by receiving a notice from the program being activated.

When a program operating on the operating system of each processor wants to know whether the programs on the other processors are activated or not, the program performs a communication with the operating system of the other processor through the other system communication apparatus 2004, 2104, for example, by instructing the format management apparatus to inquire whether the program on the other processor has been activated.

For example, in the composite computer system in the preferred embodiment of the present invention, the exclusive control management program 212 activated on the operating system 210 of the processor 110 can check as explained below whether the exclusive control management program 202 or 222 is activated on the processors 100 or 120 respectively.

When the exclusive control management program 212 is activated in the processor 110 of the composite computer system in the preferred embodiment of the present invention, the activated exclusive control management program 212 notifies the format management apparatus 2101 of the operating system 210 that the exclusive control management program 212 is activated. The format management apparatus 2101 of the operating system 210 of the processor 110 records that the exclusive control management program 212 is activated in the program condition management apparatus 2102.

When the exclusive control management program 202 or 222 is activated in the processor 100 or processor 120 respectively, it is also recorded that the exclusive control management program 202 or 222 is activated in the program condition management apparatus 2002 or 2202 respectively of the operating system of such processor by a similar sequence. Therefore, as shown in FIG. 2, in the composite computer system in the preferred embodiment of the present invention, the exclusive control management program 212 and the exclusive control management program 222 are activated in the processor 110 and the processor 120 respectively.

Here, the exclusive control management program 212 being executed in the processor 110 requests the check of operating condition of the exclusive control management program 222 in the processor 120 to the format management apparatus 2101 of the operating system 210 to determine whether the exclusive control management program 222 is activated on the processor 120 or not. The format management apparatus 2101 of the operating system 210 of the processor 110 detects that whether the exclusive control management program 222 is activated in the processor 120 by issuing an inquiry to the format management apparatus of the operating system 220 of the processor 120 via the other system communication apparatus 2104. The other system communication apparatus 2104 of processor 110 communicates, via the other system communication apparatus 2204, with format management apparatus 2201 which then determines from program condition management apparatus 2202 whether exclusive control management program 222 is activated or not. Then, the format management apparatus 2201, via the other system communication apparatuses 2204 and 2104 and the format management apparatus 2101, informs the exclusive control management program 212 of the activation status of the exclusive control management program 222 in processor 120.

Figure 3:
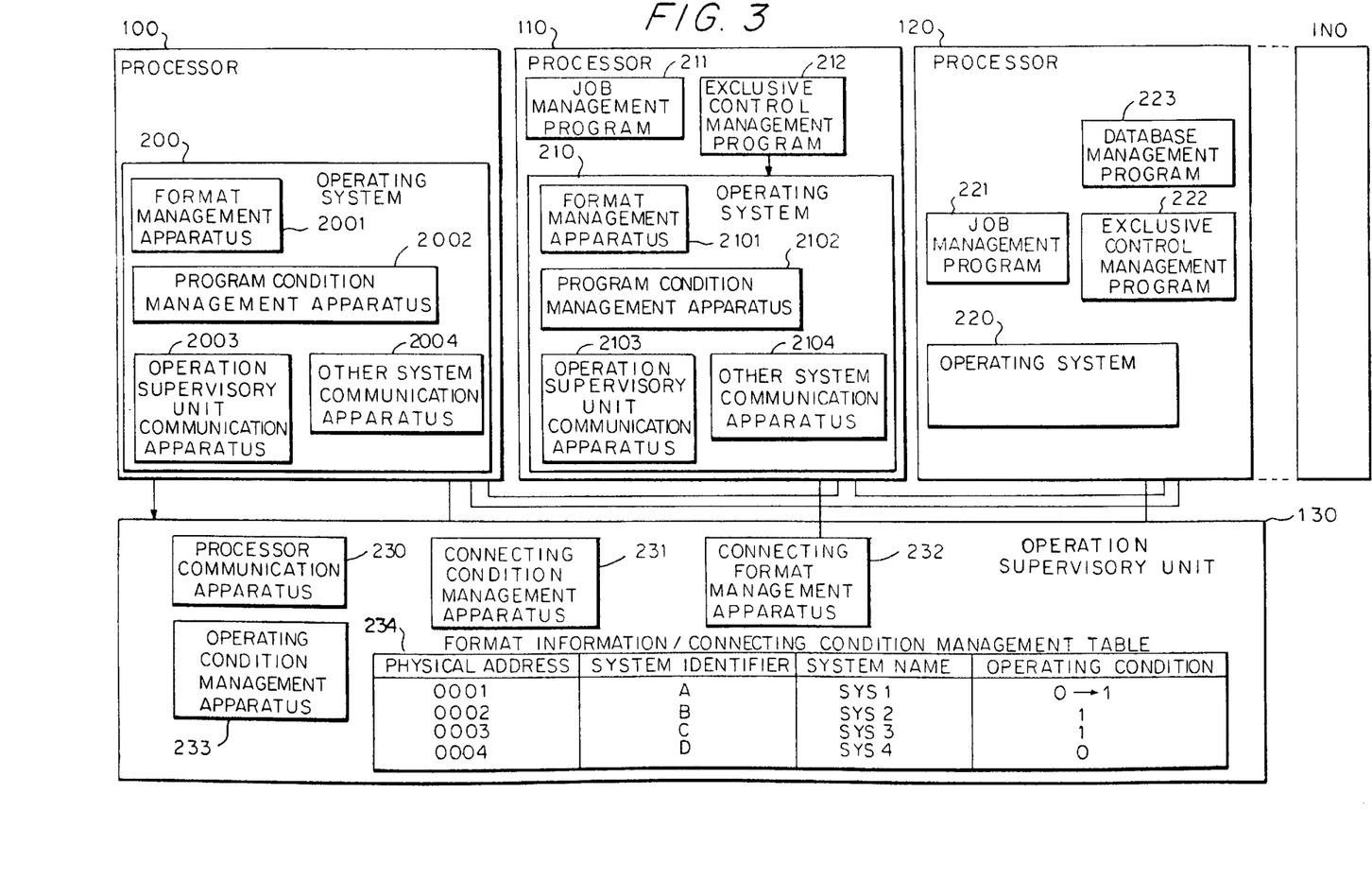
FIG. 3 is a diagram illustrating outline of operation management when the composite computer system of the first embodiment is deactivated.

Next, the operation management such as stop of systems of the processors 100, 110 and 120 or stop of program during operation in the processors 100, 110 and 120 in the composite computer system in the preferred embodiment of the present invention will be explained.

FIG. 3 illustrates the outline of operation management when the composite computer system in the preferred embodiment of the present invention is deactivated. The elements illustrated in FIG. 3 may take the form of a single computer program or plural computer programs. As shown in FIG. 3, in the operation management when the composite computer system in the preferred embodiment of the present invention is deactivated, the connecting condition supervisory apparatus 231 of the operation supervisory unit 130 and service processors 107, 117 and 127 are periodically making communication. When the systems of the processors 100, 110 or 120 stop the operation, the service processor connected to the system having stopped also stops. Since no response is returned from the service processor of the processor which has stopped due to the connecting condition supervisory apparatus 231, the operation supervisory unit 130 detects stop of the corresponding processor.

In the composite computer system concerning the preferred embodiment of the present invention, the connecting condition supervisory apparatus 231 of the operation supervisory unit 130 determines whether the processor 110 or the service processor 117 stops and, the supervisory apparatus 231 issues a notice of the condition. The processor communication apparatus 230 detects the notice that the processor 110 or the service processor 117 stops, and decides whether the notice is an inquiry of the operating condition or a notice of an activation or deactivation in the step 601 as shown in FIG. 6.

If this notice is not an inquiry and not an activation notice, in the step 607, the operation supervisory unit 103 determines whether the notice is a deactivation notice or not. If the notice is a deactivation notice, in the step 608, the operating supervisory unit 130 analyzes parameters of the deactivation notice, and transmits (changes) the parameters to show a deactivated operating condition of the processor 110, e.g., the condition of the physical address "0002", system identifier "B" and system name "SYS2" of the format information/operating condition management table 234 is changed from "1" indicating the activated condition to "0" indicating the deactivated condition.

After changing the operating condition, in step 609, the processor communication apparatus 230 of the operation supervisory unit 130 notifies the processor which is active with the parameter showing the operating condition "1" the stop of the system is occurred.

Upon detection of a notice indicating generation of stop of the system from the operation supervisory unit 130, the format management apparatus 2001 of the operating system 200 of the processor 100 extracts contents of the format information/operating condition management table 234 of the operation supervisory unit 130 with the operation supervisory unit communication apparatus 2003 to immediately detect which processor has stopped.

When a program operating on the operating system of each processor stops in the composite computer system in the preferred embodiment of the present invention stops, the operating system changes the information indicating the operating condition of the program to deactivated condition from the activated condition with the notice from the programs which stops as explained above.

When the program operating on the operating system of each processor wants to know whether the program of the other processor is activated or deactivated, it can be detected by making communication with the operating system of the other object processor to know the operating condition of the program through the other system communication apparatus by instructing the format management apparatus of the operating system of the program being activated.

For example, when the exclusive control management program 212 stops in the processor 110 of the composite computer system in the preferred embodiment of the present invention, the exclusive control management program 212 notifies that the exclusive control management program 212 is to be stopped to the format management apparatus 2101 of the operating system 210.

The format management apparatus 2101 of the operating system 210 of the processor 110 changes the information indicating the operating condition of the exclusive control management program 212 to deactivated condition from the activated condition with the program condition management apparatus 2102. Moreover, when the exclusive control management program is to be stopped with the processor 100 or 120 as the other processor, the information indicating the operating condition of the exclusive control management program on the operator of such processor is changed to the deactivated condition from the activated condition with the similar sequence.

As shown in FIG. 3, the exclusive control management program of the processor 100 is not activated in the composite computer system in the preferred embodiment of the present invention.

Here, the exclusive control management program 212 being executed in the processor 110 requests the check of operating condition of the program in the processor 100 to the format management apparatus 2101 of the operating system 210 in order to check whether the exclusive control management program is activated or not on the processor 100.

The format management apparatus 2101 of the operating system 210 of the processor 110 detects that the exclusive control management program is deactivated in the processor 100 by making inquiry to the format management apparatus 2001 of the operating system 200 of the processor 100 via the other system communication apparatus 2104. The processing procedures for locating a fault generated when a plurality of processors make access to the common data through the exclusive control management program in the composite computer system in the preferred embodiment of the present invention will be explained below.

Figure 4:
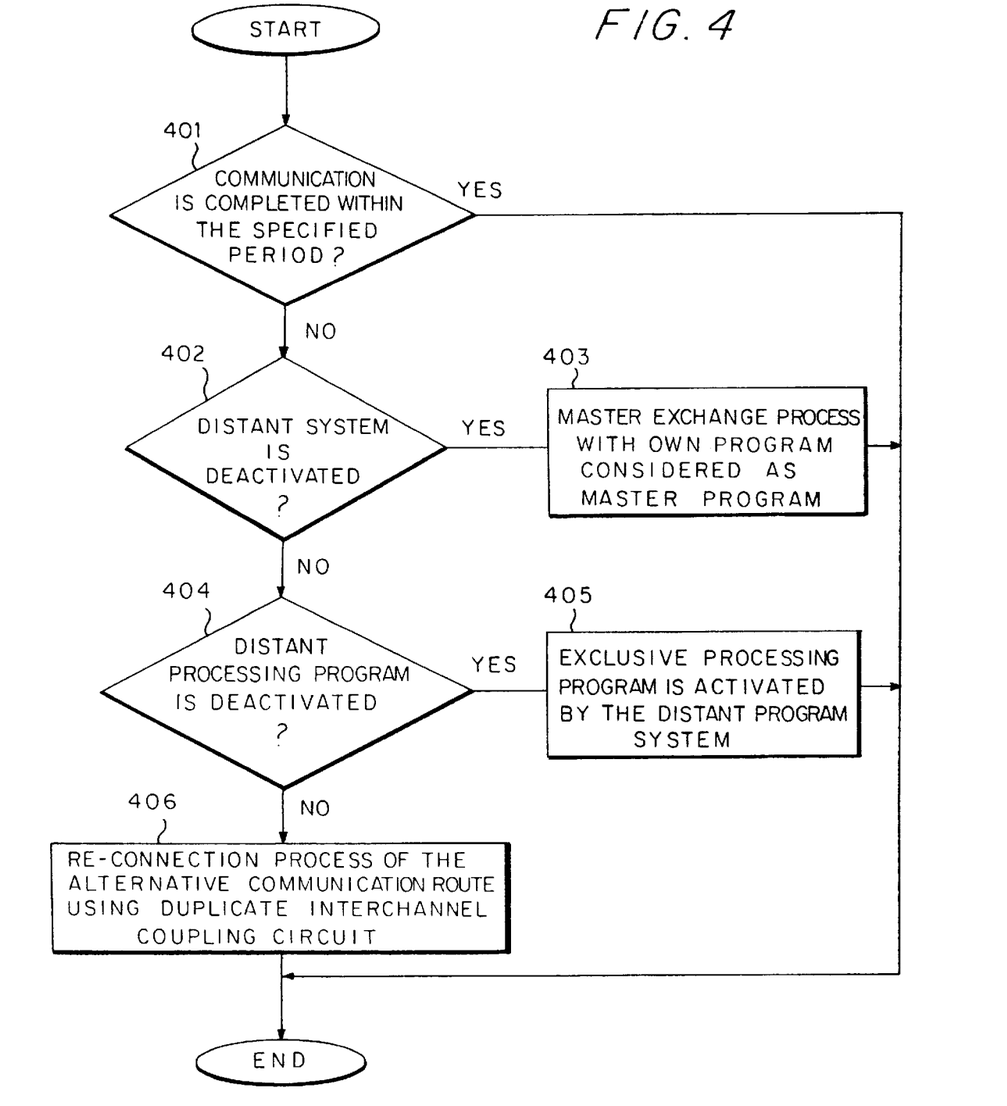
FIG. 4 is a flowchart illustrating processing procedures for fault location in the composite computer system of the first embodiment of the present invention.

FIG. 4 is a flowchart indicating the processing procedures for locating a fault generated in the composite computer system in the preferred embodiment of the present invention. The flowchart illustrated in FIG. 4 may be formed as a single computer program or plural computer programs.

In the composite computer system in the preferred embodiment of the present invention, the processors 100, 110 and 120 make access to the common data on the magnetic disk unit 140 via the exclusive control management program on each processor. The exclusive control management program on each processor is assumed to execute the exclusive control on the master and slave system the master exclusive control management program is assumed to exist in the processor 110.

In the exclusive control of the master and slave system, the exclusive control management program on the processor in the slave side should always obtain, before making access to the common data on the magnetic disk unit 140, the allowance to use the common data on the magnetic disk unit 140 from the exclusive control management program of the processor in the master side. For example, when the processor 100 makes access to the common data on the magnetic disk unit 140, it must issue an enquiry to the exclusive control management program 212 of the processor 110 via the interchannel coupling unit 160 whether the common data on the magnetic disk unit 140 may be used or not.

The exclusive control management program 212 of the processor 110 confirms that the common data on the magnetic disk unit 140 is not used in the processor 110 and processor 120 and then issues permission for use of the common data on the magnetic disk unit 140 to the processor 100 via the interchannel coupling unit 160.

Upon reception of the permission for use from the exclusive control management program 212 of the processor 110, the processor 100 makes access to the common data on the magnetic disk unit 140. If the response from the exclusive control management program 212 of the processor 110 is not received even after the prescribed period has passed, after the exclusive control management program 222 of the processor 120 issues an inquiry to the exclusive control management program 212 of the processor 110 whether the common data on the magnetic disk unit 140 may be used or not in the composite computer system in the preferred embodiment of the present invention, a fault in the route such as the fault in the communication path connecting the interchannel coupling unit and processors or in the channel unit and any one of irregular termination of the exclusive control management program 212 of the processor 110 and system-down of the processor 110 may be assumed as the cause.

In the composite computer system in the preferred embodiment of the present invention, for the processing to locate a fault generated when making access to the common data on the magnetic disk unit 140 from the processor 120, it is checked, as shown in FIG. 4, in the processing of the step 401, whether communication to the processor 110 where the exclusive control management program 212 in the master side exists has been completed or not within the particular prescribed period.

When the communication to the processor 110 where the exclusive control management program 212 in the master side exists from the processor 120 does not complete within the prescribed particular period, the format management apparatus of the operating system 220 of the processor 120 makes inquiry to the operation supervisory unit 130 whether the system of the processor 110 is deactivated or not in the step 402.

In the step 402, the format management apparatus of the operating system of the processor 120 extracts contents of the format information/operating condition management table 234 of the operation supervisory unit 130 with the operation supervisory unit communication apparatus 2003 to check whether the system of the processor 110 is deactivated or not.

On the contrary, the operation supervisory unit 130 determines whether an inquiry of the processor 120 is an inquiry of the operating condition or not, in step 601 as shown in FIG. 6. If the notice is an inquiry, in step 602, the operation supervisory analyzes parameters of the inquiry, and acquire the information of the operating condition of the processor 110, e.g., the condition of the physical address "0002", system identifier "B" and system name "SYS2" of the format information/operating condition management table 234 are acquired. After acquiring the operating condition, in the step 603, the operation supervisory unit 130 notifies the processor 120 of the operating condition of the processor 110.

When the system of the processor 110 is deactivated, the processor in the master side is changed to the processor 120 from the processor 110, in the step 403, to change the exclusive control management program 222 to the exclusive control management program in the master side.

When the system of the processor 110 is not deactivated, the format management apparatus of the operating system 220 of the processor 120 issues an inquiry, in the step 404, to know the operating condition of the exclusive control management program 212 of the processor 110 in the master side to the format management apparatus 2101 of the processor 110.

In the step 404, the format management apparatus of the operating system 220 of the processor 120 checks whether the exclusive control management program 212 is operating in the processor 110 or not by issuing an inquiry to the format management apparatus 2101 of the operating system 210 of the processor 110 via the other system communication apparatus.

When the exclusive control management program 212 of the processor 110 is deactivated, the exclusive control management program 212 on the processor 110 is activated again in the step 405. When the exclusive control management program 212 of the processor 110 is not deactivated, a fault in the communication route may be assumed and a backup communication route is used as the alternative route for the reconnection process in the step 406.

With the processing procedures explained above, fault location which has required the decision of an operator is not realized automatically in the composite computer system.

As explained above, according to the composite computer system in the preferred embodiment of the present invention, since the operating condition of a plurality of processors and the operating condition of the program on a plurality of processors are supervised through the operation supervisory network, if a fault is generated, the fault location can be made quickly and proper measure can be done to realize automatic operation for a long period and alleviate the load of the user.

Second Embodiment

The second embodiment of the composite computer system for supervising operation of the composite computer system of the present invention with a plurality of operation supervisory units will then be explained below. There can be any number of operation supervisory units and processors.

Figure 5:
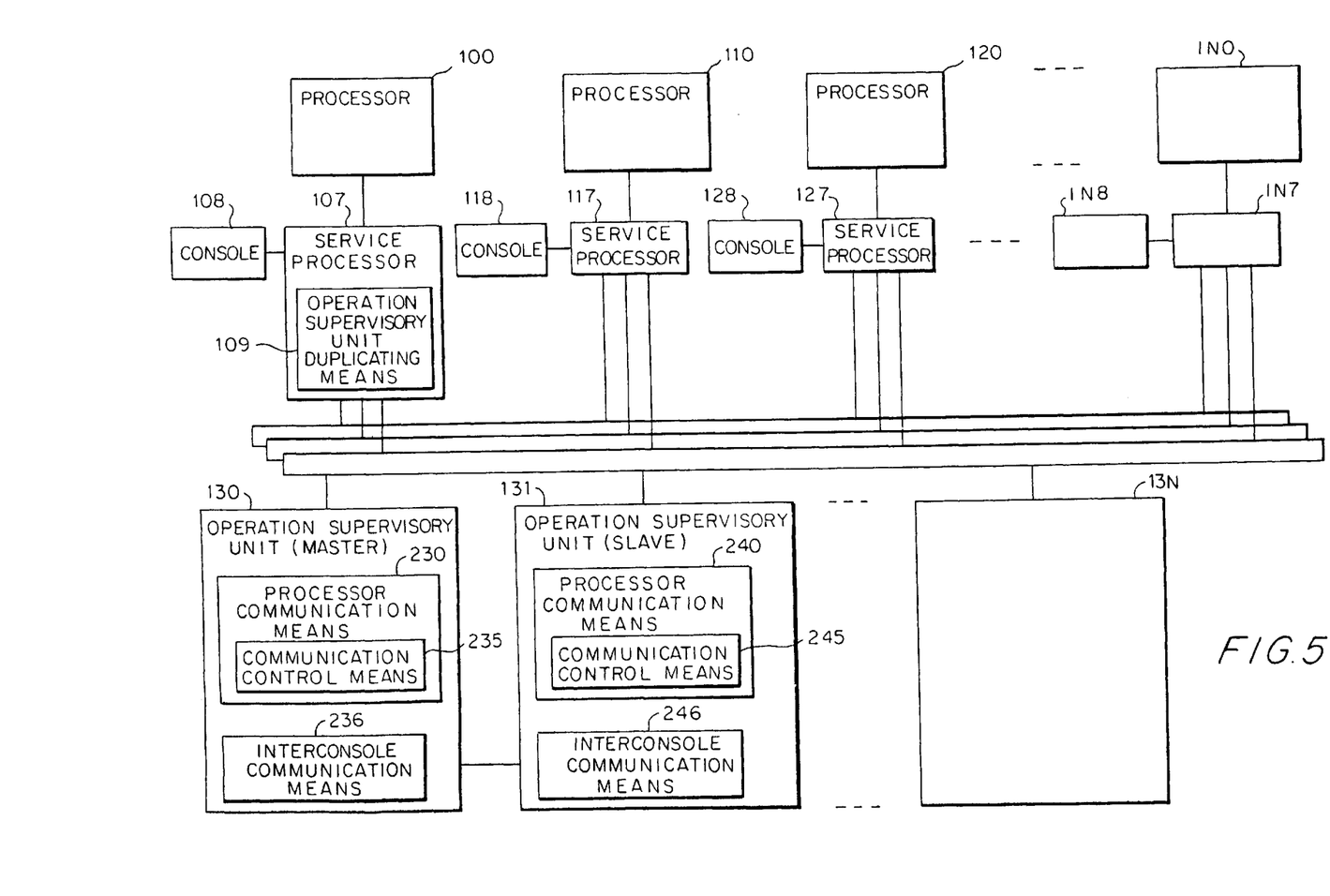
FIG. 5 is a diagram illustrating a schematic structure of the duplicated operation supervisory unit in the composite computer system of the second embodiment of the present invention.

FIG. 5 is a schematic diagram illustrating a structure of the duplicated operation supervisory unit in the composite computer system in the second embodiment of the present invention. In FIG. 5, 109 designates an operation supervisory unit duplicating apparatus; 130, an operation supervisory unit as the master unit; 131, an operation supervisory unit as the slave unit; 235 and 245, communication control apparatus; 236 and 246, inter-console communication apparatus.

As shown in FIG. 5, when the operation supervisory unit of the composite computer system in the second embodiment of the present invention is duplicated, the operation supervisory unit duplicating apparatus 109, operation supervisory unit as the master unit 130, operation supervisory unit as the slave unit 131, communication control apparatus 235 and 245 and inter-console communication apparatus 236 and 246 are comprised.

As shown in FIG. 5, in the composite computer system in the second embodiment of the present invention, the service processors 107, 117 and 127 for condition management of the processors 100, 110 and 120 are connected to the operation supervisory unit 130 as the master unit with the first LAN as the operation supervisory network and the service processors 107, 117, 127 are connected to the operation supervisory unit 131 as the slave unit with the second LAN as the operation supervisory network.

Moreover, the operation supervisory units 130 and 131 of the composite computer system in the second embodiment of the present invention are provided with the communication control apparatus 235 and 245 for controlling operations of the processor communication apparatus 230 and 240 for making communication with the processors 100, 110 and 120 and the operation supervisory units 130 and 131 are connected with each other through the inter-console communication apparatus 236 and inter-console communication apparatus 246. The management process for the operating conditions of a plurality of processors when the operation supervisory unit is duplicated in the composite computer system in the second embodiment of the present invention will be explained below.

The service processor 107 of the composite computer system in the second embodiment of the present invention is provided with an operation supervisory unit duplicating apparatus 109 which notifies a notice sent from the processor 100 to the duplicated operation supervisory units 130 and 131, respectively.

A notice is sent to the processors 100, 110 and 120 from the duplicated operation supervisory unit with the operation supervisory unit 130 as the master unit. In the operation supervisory unit 131 as the slave unit, communication to the processors 100, 110 and 120 from the operation supervisory unit 131 is controlled by the communication control apparatus 241 of the processor communication apparatus 240.

As explained previously, since communication to the processors 100, 110, 120 from the operation supervisory unit 131 is controlled by the communication control apparatus 241 of the processor communication apparatus 240 in the operation supervisory unit 131 as the slave unit, a notice to be sent when the system of the processors 100, 110, 120 is detected to be stopped is never transmitted repeatedly to the operating other processors.

In the composite computer system in the second embodiment of the present invention, when a fault is generated in the operation supervisory unit 130 as the master unit and communication between the service processors 107, 117 and 127 and operation supervisory unit 130 is disabled because any response cannot be obtained from the operation supervisory unit 130 as the master unit even after the predetermined particular time has passed, the operation supervisory unit duplicating apparatus 109 of the service processor 107 cancels the communication controlled condition of the communication control apparatus 245 provided in the processor communication apparatus 240 of the operation supervisory unit 131 as the slave unit.

When th e operation supervisory unit duplicating apparatus 109 of the service processor 107 cancels the communication controlled condition of the communication control apparatus 245, the operation supervisory unit 131 as the slave unit issues a closing instruction to the operation supervisory unit 130 as the main unit from the inter-console communication apparatus 246.

Upon reception of the closing instruction from the operation supervisory unit 131 as the slave unit, the inter-console communication apparatus 236 of the operation supervisory unit 130 as the master unit controls the communication to the processors 100, 110 and 120 from the operation supervisory unit 130 with the communication control apparatus 235 provided in the processor communication apparatus 230.

Thereby, if one operation supervisory unit of the duplicated units 130 and 131 is disabled for operation due to a fault, the processors 100, 110 and 120 are not required to consider the situation. The operating condition of the processors 100, 110, 120 are continuously supervised by the other operation supervisory unit not generating any fault.

Moreover, in the composite computer system in the second embodiment of the present invention, it is also possible that the processor is provided with a apparatus corresponding to the operation supervisory unit duplicating apparatus as the apparatus for multiplexing the operation supervisory units other than those explained above for the management of the duplicated operation supervisory unit in the side of the processor and for the supervisory of operating conditions of a plurality of processors through multiplexing of each apparatus in the operation supervisory unit.

As explained previously, according to the composite computer system in the second embodiment of the present invention, since the operating condition of a plurality of processors is supervised by a plurality of operation supervisory units, even if a particular operation supervisory unit can no longer be used due to a fault generated therein, the operating condition of a plurality of processors can be supervised continuously.

Third Embodiment

A third embodiment of the composite computer system of the present invention for the operation supervisory with the processors will be explained below.

In the composite computer system in the third embodiment of the present invention, the program operating on the processors 100, 110 and 120 issues an input/output instruction in a constant interval via the interchannel coupling units 160, 161 and 162 connecting respective processors.

For instance, the program operating on the processor 100 transmits a particular data in the program operating on the processors 110 and 120, and the program operating on the processors 110 and 120 return, upon reception of the particular data, the data confirming reception of data, as the response, to the program operating on the processor 100 as the transmitting processor.

In such a sequence, the program operating on the processors 100, 110 and 120 transmits or receives the particular data with each other. Therefore, if a fault is generated, any response cannot be received even after the predetermined particular time has passed and accordingly generation of a fault in the distant party can be assumed by the fact that no-response is returned.

As explained above, when the programs operating on a plurality of processors transmit or receive the particular data, if the number of programs for transmitting and receiving particular data increase, a communication load may be thought to increase suddenly. However, in the composite computer system in the third embodiment of the present invention, the transmission and reception frequency of the particular data may be reduced because detection of ordinary fault can be realized by the operation supervisory unit.

Therefore, in the composite computer system in the third embodiment of the present invention, it is possible that influence on the ordinary communication can be reduced by saving the overhead to transmit and receive the particular data between a plurality of processors and operating condition of a plurality of processors can be continuously supervised even if total operation of the operation supervisory unit is disabled due to generation of a fault therein.

As explained above, according to the composite computer system in the third embodiment of the present invention, since the particular data is transmitted and received among a plurality of processors to supervise the operating conditions of the other processors with each other, even if total operation of the operation supervisory unit is disabled, operating condition of a plurality of processors may be supervised continuously.

The preferred embodiments of the present invention have been explained in practical, but the present invention is not limited thereto and allows various modification within the scope of the claims.

For example, in the composite computer system connecting a plurality of processors to a computer for only exclusive control, the computer for only the exclusive control may be considered as the object of supervising the operating condition by the operation supervisory unit.

Moreover, it is also possible that a composite computer system is formed by virtually setting a plurality of processors and operation supervisory unit on the virtual computer in view of supervising the operating condition of a plurality of virtual processors described above.

Typical effects of the present invention are as follows:

(1) Since operating conditions of a plurality of processors and the operating condition of programs on a plurality of processors are supervised via the operation supervisory network, if a fault is generated, fault location can be made quickly and appropriate measure can be taken to realize automatic operation for a longer period and alleviate reduction of load on users.

(2) Since operating conditions of a plurality of processors can be supervised by a plurality of operation supervisory units, if a particular operation supervisory unit cannot be used due to a fault generated therein, operating condition of a plurality of processors can be supervised continuously.

(3) Since operating condition of the other processors is supervised by transmitting and receiving particular data between a plurality of processors, if total operation of the operation supervisory unit is disabled, operating condition of a plurality of processors can be supervised continuously.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A composite computer system for permitting access between a plurality of processors connected to each other by a communication apparatus and exclusively controlling common resources connected to said processors, said composite computer system comprising:

an operation supervisory unit which records operating conditions of said processors when at least one of said processors is activated or deactivated;

an operation supervisory network which connects said processors and operation supervisory unit to each other; and a program condition management apparatus which records operating conditions of a plurality of programs being executed by said processors when at least one program is activated or deactivated, wherein if one of said processors is unable to access a resource common to said processors because a fault occurs in another of said processors, the one processor determines a location of the fault by obtaining operating conditions of said processors recorded in said operation supervisory unit and operating conditions of said programs recorded in said program condition management apparatus through said operation supervisory network.

2. A composite computer system according to claim 1, wherein said processors supervise operating conditions with respect to each other by transmitting and receiving particular data between each other via said communication apparatus connecting said processors.

3. A composite computer system for permitting access between a plurality of processors connected to each other by a communication apparatus and exclusively controlling common resources connected to said processors, said composite computer system comprising:

an operation supervisory unit which records operating conditions of said processors when at least one of said processors is activated or deactivated;

an operation supervisory network which connects said processors and operation supervisory unit to each other;

a program condition management apparatus which records operating conditions of a plurality of programs being executed by said processors when at least one program is activated or deactivated, wherein if a fault is generated in one of said processors, a location of the fault is determined by obtaining operating conditions of said processors recorded in said operation supervisory unit and operating conditions of said programs recorded in said program condition management apparatus through said operation supervisory network;

a plurality of said operation supervisory units;

a communication control apparatus which controls communication to said processors from said operation supervisory units; and an operation supervisory unit multiplexer which multiplexes communication to said operation supervisory units from said processors and controls said communication control apparatus, wherein operating conditions of said processors are supervised by each of said operation supervisory units by transmitting operating conditions of said processors to others of said operation supervisory units by said operation supervisory unit multiplexer and controlling communication to said processors from said operation supervisory units other than said operation supervisory unit by said communication control apparatus, and, if a fault is generated in said operation supervisory unit, a communication control condition of the communication control apparatus of said operation supervisory unit having generated the fault is cancelled by said operation supervisory unit multiplexer and operating conditions of said processors are supervised continuously by said operation supervisory unit for which the communication condition has been cancelled.

4. A composite computer system according to claim 3, wherein said processors supervise operating conditions with respect to each other by transmitting and receiving particular data between each other via said communication apparatus connecting said processors.

5. A method, in a composite computer system, of permitting access between a plurality of processors connected to each other by communication apparatus and exclusively controlling common resources connected to said processors, said method comprising the steps of:

recording operating conditions of said processors when at least one of said processors is activated or deactivated;

recording operating conditions of a plurality of programs being executed by said processors when at least one program is activated or deactivated; and if one of said processors is unable to access a resource common to said processors because a fault occurs in another of said processors, determining a location of said fault by obtaining the recorded operating conditions of said processors and recorded operating conditions of said programs.

6. A method according to claim 5, wherein said step of supervising operating conditions of said processors comprises the step of:

transmitting and receiving particular data between said processors via said communication apparatus connecting said processors.

7. A method, in a composite computer system, of permitting access between a plurality of processors connected to each other by a communication apparatus and exclusively controlling common resources connected to said processors, said method comprising the steps of:

recording operating conditions of said processors when at least one of said processors is activated or deactivated;

recording operating conditions of a plurality of programs being executed by said processors when at least one program is activated or deactivated: and if a fault is generated in one of said processors, determining a location of said fault by obtaining the recorded operating conditions of said processors and recorded operating conditions of said programs;

recording operating conditions of said processors in a plurality of said operation supervisory units;

multiplexing communication to said operation supervisory units from said processors;

supervising operating conditions of said processors by each of said operation supervisory units by transmitting operating conditions of said processors to others of said operation supervisory units and controlling communication to said processors from said operation supervisory units other than said operation supervisory unit; and if a fault is generated in said operation supervisory unit, cancelling a communication control condition of said operation supervisory unit having generated the fault and supervising operating conditions of said processors continuously by said operation supervisory unit for which the communication condition has been cancelled.

8. A method according to claim 7, wherein said step of supervising operating conditions of said processors comprises the step of:

transmitting and receiving particular data between said processors via said communication apparatus connecting said processors.

9. A computer program stored on a storage medium executable by a composite computer system so as to permit access between a plurality of processors connected to each other by a communication apparatus and exclusive control of common resources connected to said processors, said computer program, when executed by said composite computer system, causes said composite computer system to perform the steps of:

recording operating conditions of said processors when at least one of said processors is activated or deactivated;

recording operating conditions of a plurality of programs being executed by said processors when at least one program is activated or deactivated; and if one of said processors is unable to access a resource common to said processors because a fault occurs in another of said processors, determining a location of said fault by obtaining the recorded operating conditions of said processors and recorded operating conditions of said programs.

10. A computer program according to claim 9, wherein said step of supervising operating conditions of said processors comprises the step of:

transmitting and receiving particular data between said processors via said communication apparatus connecting said processors.

11. A computer program stored on a storage medium executable by a composite computer system so as to permit access between a plurality of processors connected to each other by a communication apparatus and exclusive control of common resources connected to said processors, wherein said computer program, when executed by said composite computer system, causes said composite computer system to perform the steps of:

recording operating conditions of said processors when at least one of said processors is activated or deactivated;

recording operating conditions of a plurality of programs being executed by said processors when at least one program is activated or deactivated;

if a fault is generated in one of said processors, determining a location of said fault by obtaining the recorded operating conditions of said processors and recorded operating conditions of said programs;

recording operating conditions of said processors in a plurality of operation supervisory units;

multiplexing communication to said operation supervisory units from said processors;

supervising operating conditions of said processors by each of said operation supervisory units by transmitting operating conditions of said processors to others of said operation supervisory units and controlling communication to said processors from said operation supervisory units other than said operation supervisory unit; and if a fault is generated in said operation supervisory unit, cancelling a communication control condition of said operation supervisory unit having generated the fault and supervising operating conditions of said processors continuously by said operation supervisory unit for which the communication condition has been cancelled.

12. A computer program according to claim 11, wherein said step of supervising operating conditions of said processors comprises the step of:

transmitting and receiving particular data between said processors via said communication apparatus connecting said processors.

13. An operation supervisory apparatus for use in a composite computer system having a plurality of processors connected to each other by a communication apparatus wherein said operation supervisory unit permits access between the processors and controls common resources connected to the processors, said operation supervisory apparatus comprising:

a processor communication apparatus which controls communication between said processors and said operation supervisory apparatus;

an operating condition management apparatus which records operating conditions of said processors when said processors are activated or deactivated;

means for determining whether a communication from a communicating processor is an inquiry, activation notice or deactivation notice;

means for retrieving operating condition information of another processor and notifying said operating condition information to the communicating processor when said communication is an inquiry;

means for changing an operating condition of said another processor from a deactivation state to an activation state and notifying the communicating processor that said operating condition has been changed when said communication is an activation notice; and means for changing an operating condition of said another processor from an activation state to a deactivation state and notifying the communicating processor that a deactivation has occurred when said communication is a deactivation notice.

14. An operation supervisory apparatus according to claim 13, wherein each processor comprises:

an exclusive control management program, being executed by said processor for supervising operating conditions of processors other than said processor by use of said operation supervisory unit.

15. An operation supervisory apparatus for use in a composite computer system having a plurality of processors connected to each other by a communication apparatus wherein said operation supervisory unit permits access between the processors and controls common resources connected to the processors, said operation supervisory apparatus comprising:

a processor communication apparatus which controls communication between said processors and said operation supervisory apparatus, wherein each processor comprises an operating system which controls operation of said processor, wherein said operating system includes a program condition management apparatus for storing operating conditions of a computer program being executed by said processor;

an operating condition management apparatus which records operating conditions of said processors when said processors are activated or deactivated;

means for determining whether a communication from a communicating processor is an inquiry, activation notice or deactivation notice;

means for retrieving operating condition information of another processor and notifying said operating condition information to the communicating processor when said communication is an inquiry;

means for changing an operating condition of said another processor from a deactivation state to an activation state and notifying the communicating processor that said operating condition has been changed when said communication is an activation notice; and means for changing an operating condition of said another Processor from an activation state to a deactivation state and notifying the communicating processor that a deactivation has occurred when said communication is a deactivation notice.

16. An operation supervisory apparatus according to claim 15, wherein each processor comprises:

an exclusive control management program, being executed by said processor, for controlling operating conditions of processors other than said processor by use of said operation supervisory unit.

17. A method, in an operation supervisory apparatus included in a composite computer system having a plurality of processors connected to each other by a communication apparatus, of permitting access between the processors and controlling common resources connected to the processors, said method comprising the steps of:

controlling communication between said processors and said operation supervisory apparatus;

recording operating conditions of said processors when said processors are activated or deactivated;

determining whether a communication from a communicating processor is an inquiry, activation notice or deactivation notice;

retrieving operating condition information of another processor and notifying said operating condition information to the communicating processor when said communication is an inquiry;

changing an operating condition of said another processor from a deactivation state to an activation state and notifying the communicating processor that said operation condition has been changed when said communication is an activation notice; and changing an operation condition of said another processor from an activation state to a deactivation state and notifying the communicating processor that a deactivation has occurred when said communication is a deactivation notice.

18. A method according to claim 17, wherein each processor comprises:

an operating system which controls operation of said processor, wherein said operating system includes a program condition management apparatus for storing operating conditions of a computer program being executed by said processor.

19. A method according to claim 17, wherein each processor comprises:

an exclusive control management program, being executed by said processor for supervising operating conditions of processors other than said processor by use of said operation supervisory unit.

20. A method according to claim 18, wherein each processor comprises:

an exclusive control management program, being executed by said processor, for controlling operating conditions of processors other than said processor by use of said operation supervisory unit.

21. A computer program stored on a storage medium for performing operation supervisory functions when executed by a composite computer system having a plurality of processors connected to each other by a communication apparatus so as to permit access between the processors and control common resources connected to the processors, said computer program, when execute by said composite system, causes said composite computer system to perform the steps of:

controlling communication between said processors and an operation supervisory apparatus;

recording operating conditions of said processors when said processors are activated or deactivated;

determining whether a communication from a communicating processor is an inquiry, activation notice or deactivation notice;

retrieving operating condition information of another processor and notifying said operating condition information to the communicating processor when said communication is an inquiry;

changing an operating condition of said another processor from a deactivation state to an activation state and notifying the communicating processor that said operating condition has been changed when said communication is an activation notice; and changing an operating condition of said another processor from an activation state to a deactivation state and notifying the communicating processor that a deactivation has occurred when said communication is a deactivation notice.

22. A computer program according to claim 21, wherein each processor comprises:

an operating system which controls operation of said processor, wherein said operating system includes a program condition management apparatus for storing operating conditions of a computer program being executed by said processor.

23. A computer program according to claim 21, wherein each processor comprises:

an exclusive control management program, being executed by said processor for supervising operating conditions of processors other than said processor by use of said operation supervisory unit.

24. A computer program according to claim 22, wherein each processor comprises:

an exclusive control management program, being executed by said processor, for controlling operating conditions of processors other than said processor by use of said operation supervisory unit.

* * * * *